Patented July 14, 1931

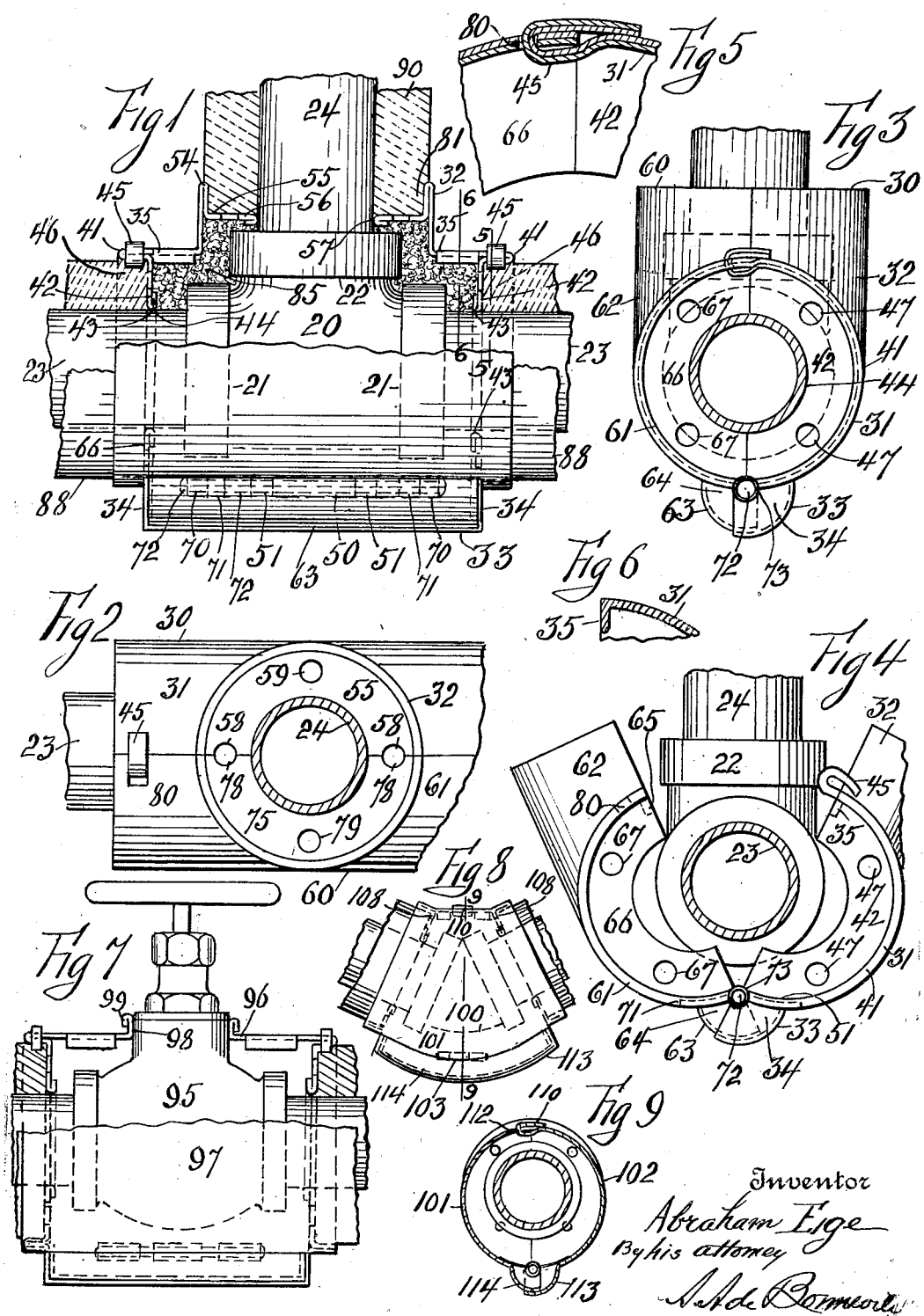

1,814,134

UNITED STATES PATENT OFFICE

ABRAHAM EIGE, OF JERSEY CITY, NEW JERSEY

INSULATION CASING FOR PIPE FITTINGS, VALVES AND THE LIKE

Application filed December 28, 1928. Serial No. 328,915.

This invention relates to an insulation casing for pipe fittings, valves and the like.

The object of the invention is the production of a casing, by means of which a pipe fitting, valve, and the like can be quickly and easily covered by an insulating material like asbestos cement. The second object of the invention is the production of a casing, by means of which an insulating sleeve can be easily located in place over piping extending from a pipe fitting, valve and the like and joined with an insulating material covering said fitting or valve. The third object of the invention is the production of a casing for holding an insulating material initially plastic, and by means of which the said material will not be projected from any hinge joints of the casing.

In the accompanying drawings Fig. 1 represents a side elevation partly broken away and a part vertical section of an exemplification of the insulation casing with a pipe fitting; Fig. 2 shows a top view of Fig. 1 partly broken away and some of the elements omitted; Fig. 3 is a right hand end view of Fig. 1 with some of the elements omitted; Fig. 4 indicates a view similar to Fig. 3 with some of the elements in a different position; Fig. 5 represents an enlarged section of Fig. 1 on the line 5, 5; Fig. 6 shows an enlarged section of Fig. 1 on the line 6, 6; Fig. 7 represents a side elevation of the casing, partly broken away for a valve; Fig. 8 shows a side elevation of the insulation casing for a forty five degree elbow; Fig. 9 is a partial section of Fig. 8 on the line 9, 9. Referring to Figs. 1 to 4, a T is indicated at 20 having the flanges 21 and 22. Pipes 23 extend from the flanges 21 and a pipe 24 extends from the flanges 22.

The insulation casing comprises a pair of members indicated in their entireties by the numerals 30 and 60. The member 30 comprises the semicylindrical portion 31, which has formed therewith the second cylindrical portion 32 at right angles thereto. The cylindrical portion 31 has formed adjacent to one edge thereof the supplemental longitudinal cylindrical portion 33 having the end walls 34. At one end of the cylindrical portion 31 are formed a pair of stop flanges 35. The ends of the cylindrical portion 31 have formed therewith the return bends 41, which latter joins with the end heads 42. The latter have formed therewith the return bends 43 to form the main end openings 44. The cylindrical portion 31 has extending therefrom the clamping bands 45. Annular pockets 46 are formed with the heads 42. Openings 47 are formed in the heads 42. A hinge member 50 is indicated having the legs 51 which latter have their ends fastened to the inner face of the semicylindrical portion 31. The cylindrical portion 32 has formed therewith the return bend 54 which joins with the third head 55. The latter has formed therewith the return bend 56 to form the opening 57. Supplemental openings 58 and 59 are formed in the head 55. The member 60 is practically the same as the member 30 and is indicated with the cylindrical portion 61 similar to 31. A cylindrical portion 62 similar to 32 is formed with the portion 61. A supplemental longitudinal cylindrically curved portion 63 having end walls 64 is formed with the portion 61. The portion 61 has formed therewith stop lugs 65 similar to 35. End heads 66 are formed with the cylindrical portion 61 similar to 42. Openings 67 similar to 47 are formed in the heads 66. A pair of hinge members 70 having the legs 71 similar to 50 and 51 extend from the portion 61. A hinge pin 72 is provided for the members of the hinge and an opening 73 is formed in the heads 42 and 66, to enable the hinge pin 72 to be located in place. A third head 75 similar to 55 is formed with the cylindrical portion 62. Openings 78 and 79 are formed in the head 75. A pair of openings 80 are formed in the cylindrical portion 61 for the clamping bands 45. An annular pocket 81 is formed with the heads 55 and 75. To use the insulation casing it is first partially filled with asbestos cement 85 or other heat insulating materials, with its members 30 and 60 in their open position. The casing with the cement is then placed over the T 20 and swung to its closed position with the clamping bands 45 engaging the openings 80. In the closed position of the members 30 and 60, the outer ends of the portions 33 and 63 collapse with each other and cover the hinge of said members. Some of the asbestos cement will flow through the openings in the heads 42, 66, 55 and 75. Annular portions of asbestos coverings 88 are located in the pockets 46 and the ends are brought to bear against the heads 42 and 66, and the asbestos cement which has passed through the openings in said heads 42 and 66, cements the said coverings in place. An annular covering 90, of asbestos and the like is located in the pocket 81, and is cemented in place by the asbestos cement that has passed through the openings 58, 59, 78 and 79.

Referring to Fig. 7 a valve is indicated at 95 and the insulation casing is indicated having a pair of members 96 and 97 similar to 31 and 61. The heads 55 and 75 are dispensed with and a sleeve 98 with the return bend 99 is formed with the members 96 and 97 to engage the valve 95.

Referring to Fig. 8 a forty-five degree elbow is indicated at 100. The casing comprises a pair of curved semicylindrical members 101 and 102 hinged to each other by means of the hinge 103. End heads 108 similar to each other and similar to the ends heads 42 and 66 are provided for the members 101 and 102. A clamping band 110 similar to 45 extends from the member 102 and engages an opening 112 in the member 101 to clamp said members to each other. The member 102 has formed therewith the supplemental cylindrically curved portion 113 and the member 101 has formed therewith the supplemental cylindrically curved portion 114.

Various modifications may be made in the invention and the present exemplification is to be taken as illustrative and not limitative thereof.

Having described my invention what I desire to secure by Letters Patent and claim is:

1. In an insulation casing the combination of a pair of semicylindrical portions, a hinge connecting the portions, a supplemental longitudinal cylindrically curved portion extending from each semi-cylindrical portion, said cylindrically curved portions adapted to collapse relatively to each other and covering said hinge in their collapsed position and means to clamp the pair of semicylindrical portions to each other.

2. In an insulation casing the combination of a pair of semicylindrical portions adapted to contain a heat insulating material, end heads for the portions forming pockets, said end heads having main openings and supplemental openings, said main openings adapted to have extending therethrough pipes extending from a fitting in the casing, said supplemental openings adapted for the flow there through of a portion of the insulating material from the interior of the casing, a hinge connecting the portions, a supplemental cylindrically curved portion extending from each of said semicylindrical portions, said cylindrically curved portions adapted to collapse relatively to each other and covering said hinge in their collapsed position and means to clamp the pair of said semicylindrical portions to each other.

3. In an insulation casing the combination of a pair of semicylindrical portions, a hinge connecting the said portions at one end thereof, a clamping band extending from the other end of one of said portions adapted to enter an opening extending through the other portion to clamp the portions together, said portions adapted to contain a heat insulating material to cover a pipe fitting, and end heads for the pair of semicylindrical portions having main openings for pipes to extend therethrough and supplemental openings for the flow of a portion of the insulating material therethrough, said end heads forming pockets adapted to support pipe coverings and said coverings cementing with portions of the insulating material that extends through said supplemental openings.

4. In an insulation casing the combination of a pair of portions, a hinge connecting the portions, means extending from the portions of the casing covering said hinge and means to clamp the pair of portions to each other.

5. In an insulation casing the combination of a pair of portions, heads having each a main opening and supplemental openings formed with the portions, said heads forming pockets with said portions, a hinge connecting the portions, means extending from the portions covering said hinge, said casing adapted to enclose a pipe fitting and also enclosing an insulation material covering said pipe fitting and means to clamp the portions of the casing to each other, said pockets adapted to support pipe coverings.

Signed at the borough of Manhattan, city of New York in the county of New York and State of New York this 14th day of December A. D. 1928.

ABRAHAM EIGE.